United States Patent
Ruffino et al.

(10) Patent No.: US 7,478,556 B2
(45) Date of Patent: Jan. 20, 2009

(54) APPARATUS FOR THE RAPID MEASUREMENT OF TEMPERATURES IN A HOT GAS FLOW

(75) Inventors: Paolo Ruffino, Mellingen (CH); Hanspeter Zinn, Baden-Ruetihof (CH)

(73) Assignee: Alstom Technology Ltd, Baden (CH)

( * ) Notice: Subject to any disclaimer, the term of this patent is extended or adjusted under 35 U.S.C. 154(b) by 395 days.

(21) Appl. No.: 11/256,719

(22) Filed: Oct. 24, 2005

(65) Prior Publication Data
US 2006/0088075 A1 Apr. 27, 2006

(30) Foreign Application Priority Data
Oct. 25, 2004 (CH) .................................. 1758/04

(51) Int. Cl.
*G01F 1/68* (2006.01)
(52) U.S. Cl. ................... 73/204.26; 73/204.27
(58) Field of Classification Search ............. 73/204.26, 73/204.27
See application file for complete search history.

(56) References Cited

U.S. PATENT DOCUMENTS

| 3,352,154 | A | * | 11/1967 | Djorup | 73/204.26 |
|---|---|---|---|---|---|
| 3,604,261 | A | * | 9/1971 | Olin | 73/204.26 |
| 3,828,332 | A | | 8/1974 | Rekai | |
| 4,616,505 | A | * | 10/1986 | Jouwsma | 73/204.26 |
| 4,735,086 | A | * | 4/1988 | Follmer | 73/204.26 |
| 4,752,141 | A | * | 6/1988 | Sun et al. | 374/161 |
| 6,609,412 | B2 | | 8/2003 | Dimarzo et al. | 73/25.01 |
| 6,684,695 | B1 | * | 2/2004 | Fralick et al. | 73/204.26 |
| 7,179,421 | B1 | * | 2/2007 | Ho | 422/82.02 |

FOREIGN PATENT DOCUMENTS

EP 0 878 707 11/1998

OTHER PUBLICATIONS

European Search Report for EP 05 10 9473, Feb. 14, 2006.

* cited by examiner

*Primary Examiner*—Harshad Patel
(74) *Attorney, Agent, or Firm*—Darby & Darby

(57) ABSTRACT

An apparatus for a rapid measurement of temperatures in a hot gas flow, in particular in a gas turbine. The apparatus includes a sensor having two two-dimensional, electrically conductive heating elements, which are attached to the surface of a common, electrically insulating sensor body.

20 Claims, 4 Drawing Sheets

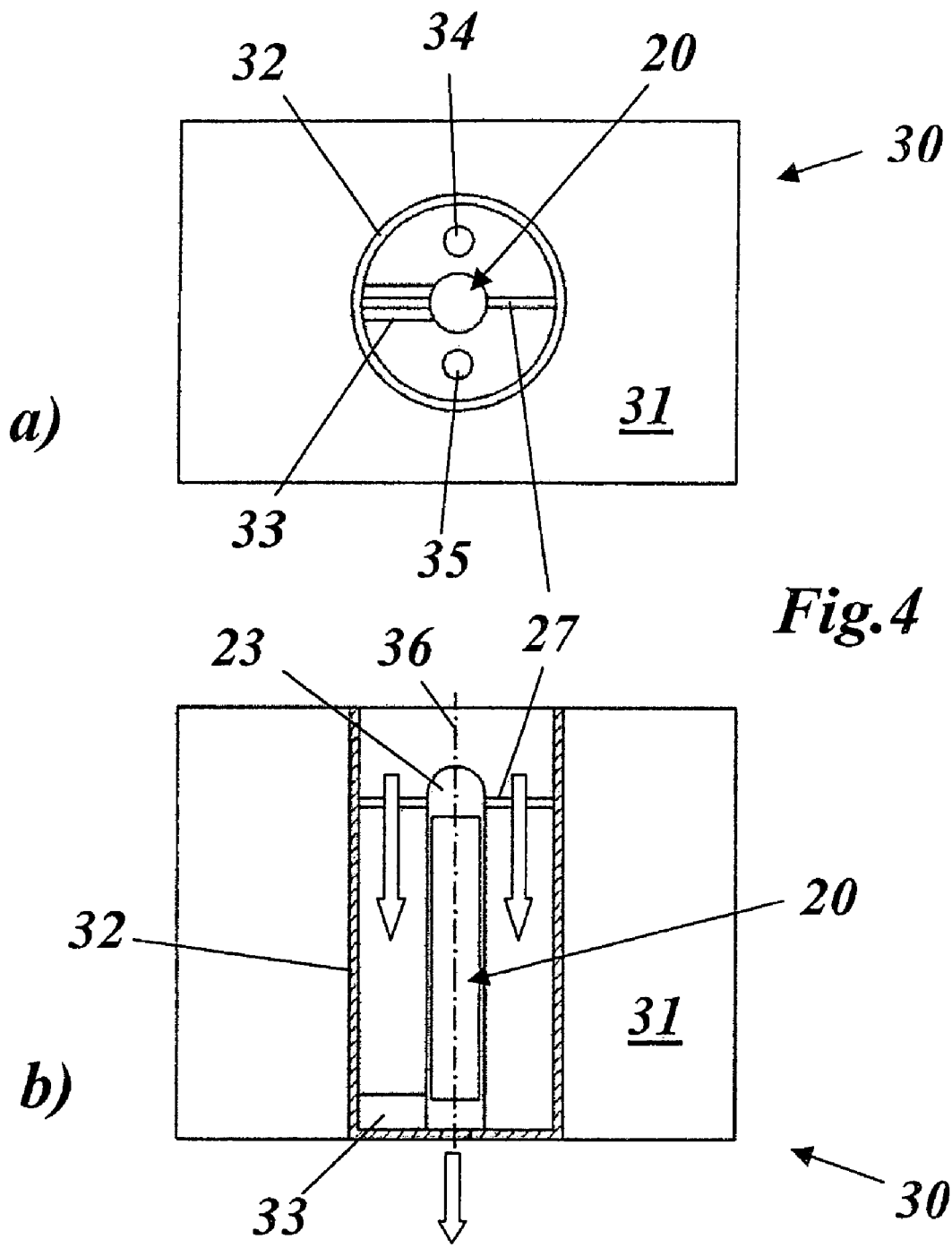

APPARATUS FOR THE RAPID MEASUREMENT OF TEMPERATURES IN A HOT GAS FLOW

Priority is claimed to Swiss Patent Application No. CH 01758/04, filed on Oct. 25, 2004, the entire disclosure of which is incorporated by reference herein.

The present invention relates to the field of temperature measurement technology. It relates to an apparatus for the rapid measurement of temperatures in a hot gas flow.

BACKGROUND

It is of central importance in a gas turbine to determine the temperature distribution in the hot gas flow at the turbine outlet, since the efficiency of the overall gas turbine is influenced by this temperature distribution. In particular, this temperature distribution is critical for improving the design of the turbine and for controlling the turbine operation. In particular in relation to turbine control, it is known that the time constant of the TOT measured value pick-up (TOT=Turbine Outlet Temperature), which is currently in use and operates using thermocouples, is greater than one second (approximately 3 s), while the time constant of the turbine blades is below one second. This results in the risk of damage to the first turbine stages since the thermocouples cannot detect a thermal overload with the required speed. Furthermore, in the case of measured value pick-ups based on thermocouples, any attempt at increasing the time response results, without exception, in a reduction in the service life.

SUMMARY OF THE INVENTION

It is an object of the present invention to provide an apparatus for the measurement of temperatures in a hot gas flow, in particular a gas turbine, which is distinguished by a markedly reduced time constant, in addition to high reliability, a simple design, good accuracy and/or flexible applicability.

The present invention provides an apparatus for the rapid measurement of temperatures in a hot gas flow, in particular in a gas turbine, characterized in that the apparatus comprises a sensor having two two-dimensional, electrically conductive heating elements, which are attached to the surface of a common, electrically insulating sensor body. These two heating elements may be incorporated in a branch of a bridge circuit with an additional connecting resistor, as is known, for example, from FIG. 5 in U.S. Pat. No. 6,609,412, which is incorporated by reference herein. In this circuit, the two heating elements are heated to different temperatures, and the resistance in the bridge branch with the heating elements is kept constant by means of a closed-loop control circuit. The gas temperature can then be determined by means of a linear equation of the ratio of the voltage drops across the colder heating element and the connecting resistor.

A refinement of the invention which is particularly favorable in terms of flow technology and is particularly suitable, owing to its mechanical robustness, for the high flow speeds in a gas turbine, is one in which the sensor body is cylindrical and extends along an axis, and the heating elements are arranged on opposite sides of the cylinder surface of the sensor body in relation to the axis and are in the form of elongate, thin layers extending in the axial direction. The heating elements are preferably in the form of thin metal layers, in particular made from Pt.

In relation to the use as a bridge branch of a measuring circuit, it is particularly advantageous if the heating elements are electrically conductively connected to one another at one end. This connection is particularly simple and reliable if the sensor body is terminated at one end by an electrically conductive sensor head, in particular made from Cu, and the heating elements are electrically conductively connected to one another via the sensor head.

The sensor body, which may be in the form of a solid body or a tube, is preferably made from a ceramic.

The measurement accuracy and robustness of the apparatus can be further improved by the sensor being surrounded concentrically, at a distance, by a radiation shield, which forms an annular channel together with the sensor, the gas to be measured being passed through said annular channel past the heating elements.

The electrical circuit is further simplified by the radiation shield being electrically conductive and being electrically conductively connected to the sensor head for the purpose of grounding the sensor head.

In order that the sensor can be fixed to a base body, the annular channel is preferably closed at one end. The hot gas to be measured enters the annular channel through the open end. Outlet openings are then provided in the radiation shield at the closed end of the annular channel for the outlet of the hot gas.

In order to measure the gas temperature, it is particularly advantageous if the heating elements are conductively connected to one another directly at one end and via a first resistor at the other end, and if the circuit comprising the heating elements and the resistor forms a branch of a measurement bridge.

The measurement bridge is preferably part of a circuit arrangement, which keeps the resistance in the branch of the measurement bridge constant, said branch comprising the heating elements and the first resistor. In particular, the circuit arrangement comprises a closed-loop control circuit, which adjusts the current in a bridge diagonal such that the voltage difference in the other bridge diagonal disappears.

BRIEF DESCRIPTION OF THE DRAWINGS

The present invention is explained in more detail below with reference to exemplary embodiments in conjunction with the drawings, in which:

FIG. 4 shows a plan view from above (FIG. 4a) and a partially sectioned side view (FIG. 4b) of a second temperature probe having a sensor as shown in FIG. 2.

DETAILED DESCRIPTION

Figure 1:
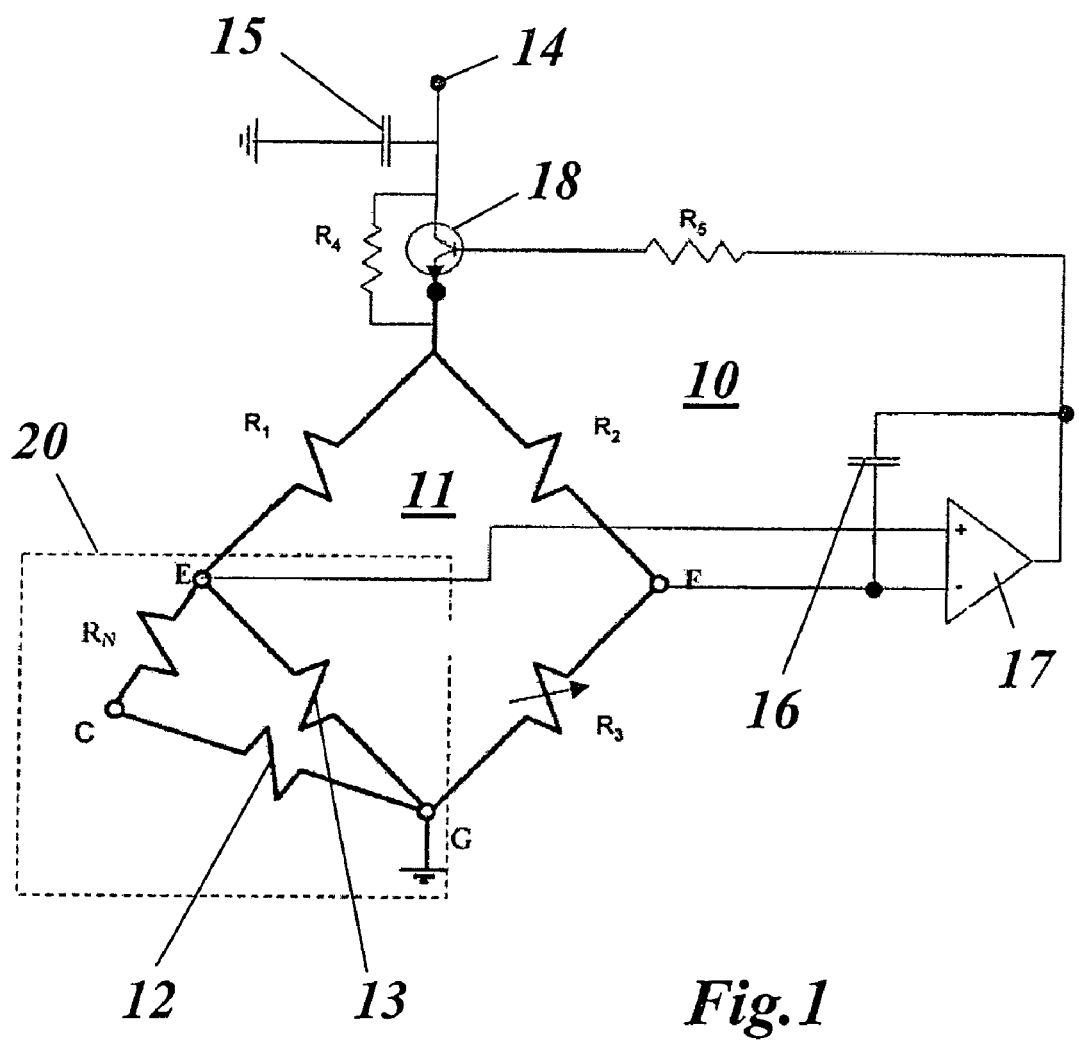
FIG. 1 shows an exemplary circuit arrangement known per se, in which the sensor can be used according to the invention.

FIG. 1 depicts a circuit arrangement or measuring circuit 10, which is known per se from U.S. Pat. No. 6,609,412 and can be used in conjunction with the sensor according to the invention for the purpose of measuring the hot gas temperature, in particular in a gas turbine. The circuit arrangement 10 comprises a measurement bridge having four bridge branches, of which three are formed by the resistors $R_1$, $R_2$ and $R_3$. The resistor $R_3$ is designed such that it can be adjusted so as to match the bridge. The fourth bridge branch is formed by two heating elements 12 and 13, which are connected to one another directly at one end and via a further resistor $R_N$ at the other end. The point G of the measurement bridge 11, at which the two heating elements 12, 13 are connected to one another directly, is connected to ground. The point, which lies diagonally opposite the point G, of the measurement bridge 11 is connected to a supply connection 14 via the collector/emitter path of a transistor 18, the supply voltage being applied to said supply connection 14 during operation. The two other diagonally opposite points E and F of the measurement bridge 11 are connected to the inputs of an operational amplifier 17, whose output drives the base of the transistor 18 via a resistor $R_5$. A further resistor $R_4$ between the collector and the emitter of the transistor 18 and two capacitors 15, 16 for the purpose of suppressing faults complete the circuit. The transistor 18 allows a current to flow through the measurement bridge 11, owing to the driving by means of the operational amplifier 17, this current being precisely so high that the voltage difference $\Delta V_{EF}$ between the points E and F of the bridge is zero. Since the resistances of $R_1$, $R_2$ and $R_3$ are constant during operation, the resistance in the fourth bridge branch having the heating elements 12 and 13 is thus also constant. At the same time, the resistor $R_N$ ensures, with the same heating elements 12 and 13, that less current flows through the heating element 12 than through the heating element 13. Correspondingly, the heating element 12 is the "cold" heating element, while the heating element 13 is the "hot" heating element.

As is explained in detail in the document U.S. Pat. No. B2 6,609,412 cited further above, it is possible, by means of the circuit arrangement 10 illustrated in FIG. 1, for the temperature $T_G$ of a gas flowing past the two heating elements 12, 13 to be derived from the following equation $T_G = \alpha \cdot R_1 \cdot w - \beta \cdot R_1$  $\alpha, \beta$ constants where $w = \Delta V_{CG} / \Delta V_{EC}$, the voltage $\Delta V_{CG}$ between the points C and G dropping across the heating element 12, and the voltage $\Delta V_{EC}$ between the points E and C dropping across the resistor $R_N$.

The use in the hot gas flow of a gas turbine now places particular requirements on the two heating elements 12 and 13, which are part of a sensor 20 (dashed box in FIG. 1; the resistor $R_N$ does not itself belong to the sensor 20 but is part of the rest of the circuit arrangement, which is located outside the use location). The sensor 20 preferably has the design illustrated in FIG. 2; two thin metal layers 21, 22 made from platinum (Pt) are applied to opposite sides of a solid- or hollow-cylindrical sensor body 19, which extends along an axis 36 and is preferably made from an electrically insulating ceramic suitable for the high temperatures. In principle, platinum can be used up to temperatures of approximately 1700° C. The metal layers 21, 22 in their axial extent form the two heating elements 12, 13 of the sensor 20. They are attached to the sensor body 19 such that they fixedly adhere using conventional methods of thin-layer technology or else thick-film technology. The thickness of the layers 21, 22 and their dimensions in the axial and circumferential direction depend on the type of use (turbine, flow speed, hot gas temperature etc.). The direct, conductive connection of the two heating elements 12, 13 or metal layers 21, 22 at their one end is brought about by an electrically conductive sensor head 23, which is preferably made from Cu and is connected to or overlaps the metal layers 21, 22. At the other (free) ends of the heating elements 12, 13 or metal layers 21, 22, the electrical connection is provided using Cu wires, which are not illustrated in the figures. Owing to the type of arrangement and attachment of the heating elements 12, 13 in the sensor 20, a high mechanical robustness is ensured. At the same time, the heating elements 12, 13 are close to one another and are thus subjected to the same gas flow, but without influencing one another thermally in a disadvantageous manner.

Figure 2:
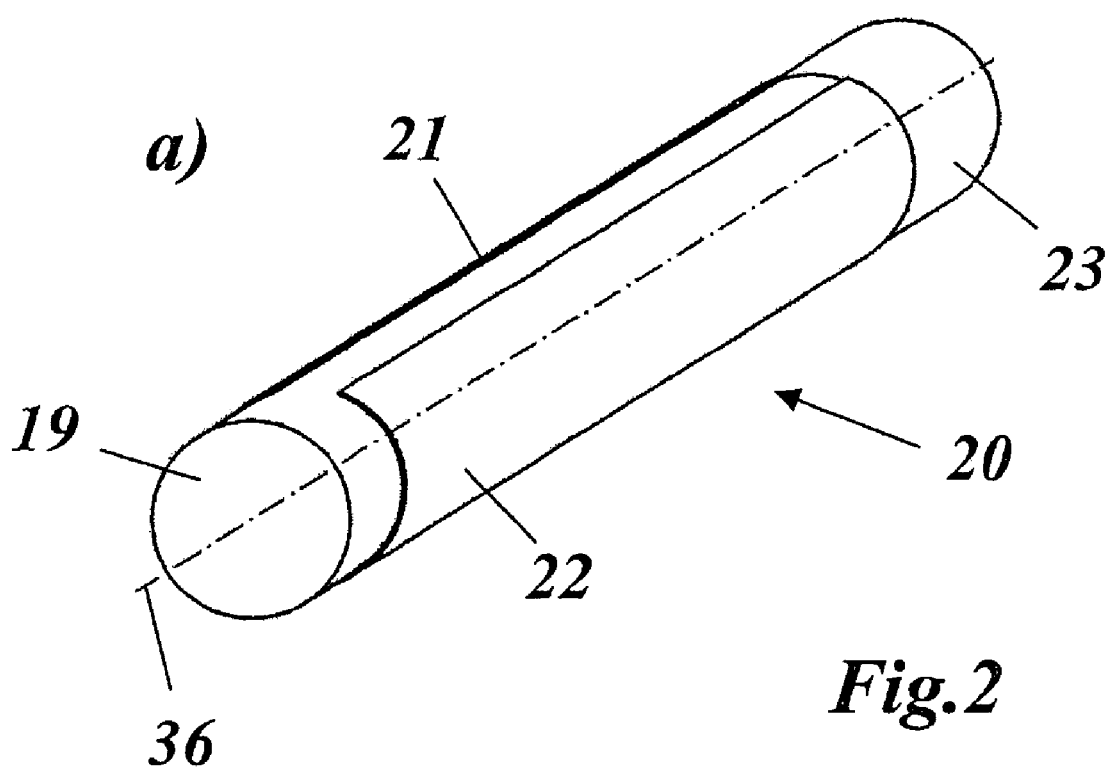
FIG. 2 shows a perspective side view (FIG. 2a) of and a cross section (FIG. 2b) through a sensor for the purpose of measuring the hot gas temperature of a gas turbine in accordance with a preferred exemplary embodiment of the invention.
Figure 2:
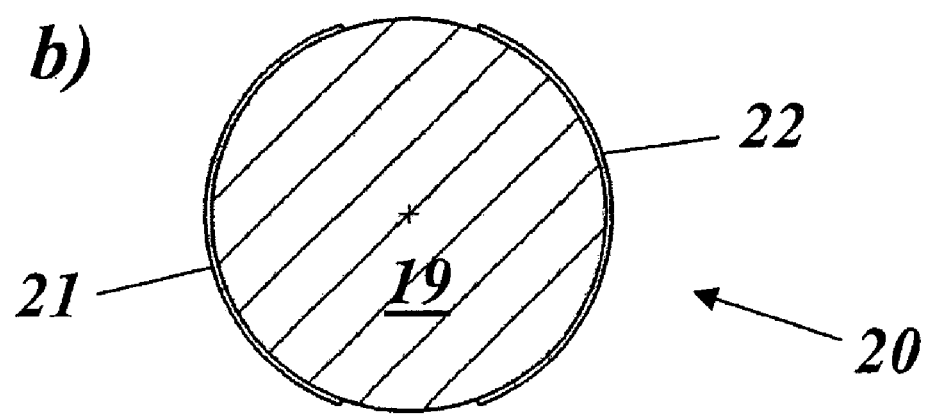
Figure 3:
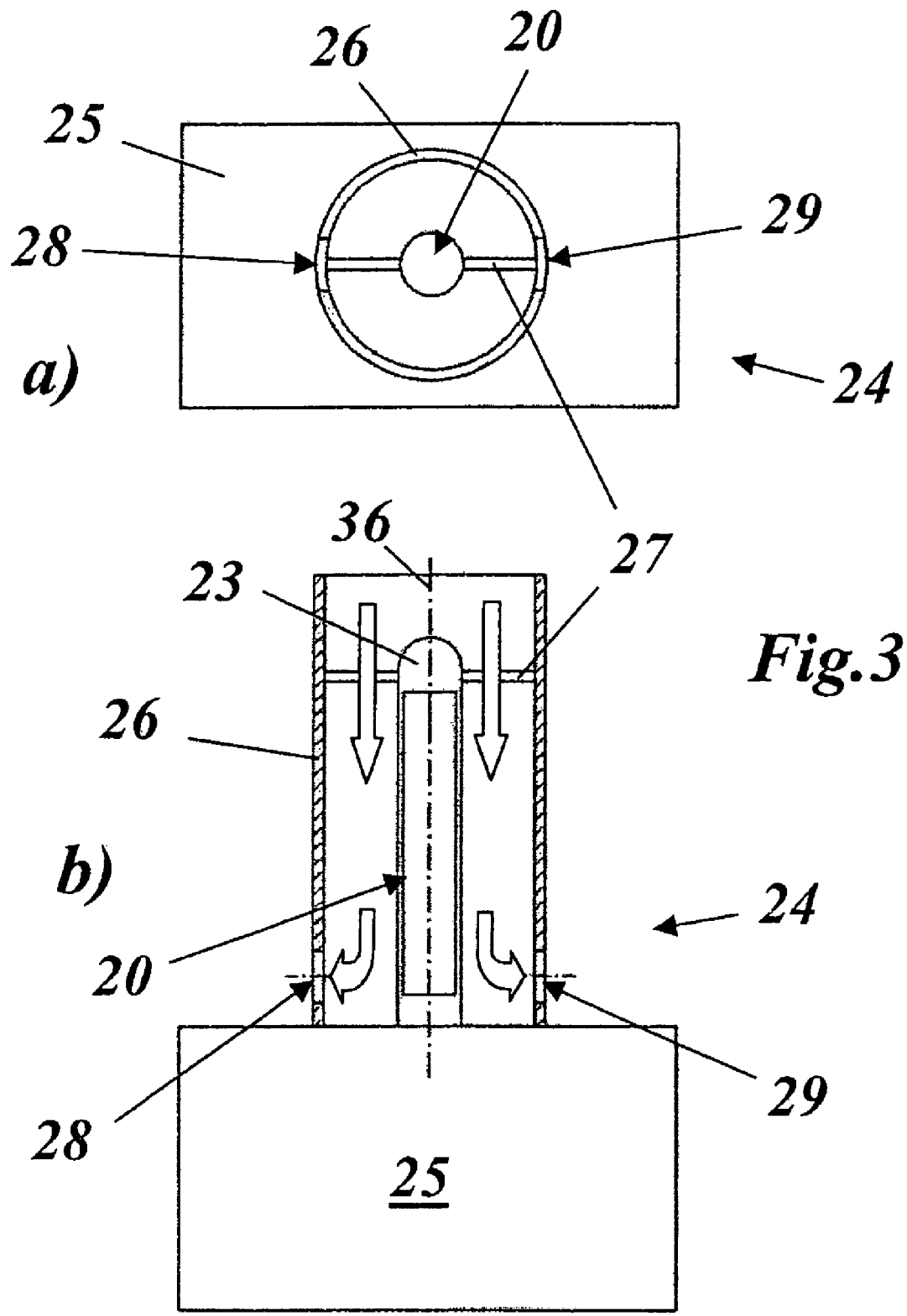
FIG. 3 shows a plan view from above (FIG. 3a) and a partially sectioned side view (FIG. 3b) of a first temperature probe having a sensor as shown in FIG. 2.

The sensor 20 with the metal layers 21, 22 or heating elements 12, 13 is fixed to a base body during use and is surrounded by a radiation shield, said base body and said radiation shield together forming a temperature probe which can be integrated. FIGS. 3 and 4 depict two possible designs of such a temperature probe having a sensor 20 as shown in FIG. 2. In the case of the temperature probe 24 in FIG. 3, the sensor 20 is fixed such that it rests on the upper side of a (parallelepipedal) base body 25. It is surrounded concentrically by a radiation shield 26 in the form of a tube piece. The radiation shield 26, which protrudes in the axial direction over the sensor 20, is electrically conductive and is made from, for example, a metal, in particular steel. Together with the central sensor 20, it forms an annular channel, through which the gas to be measured enters from above, flows axially along the sensor 20 and the attached heating elements 12, 13, and emerges again through lateral outlet openings 28, 29 in the lower part (cf. the broad flow arrows in FIG. 3b). As a result, in addition to protection against radiation (and a mechanical protection), the flow in the measurement section is made more uniform. Furthermore, the radiation shield 26 is used as a ground connection for the sensor head 23 or the heating elements 12, 13 at point G of the measurement bridge 11. For this purpose, connection lines 27 run transversely through the annular channel from the sensor head 23 to the radiation shield 26, which is for its part connected in the interior of the base body 25. Similarly, the heating elements 12, 13 are connected at the lower ends to the measuring circuit (resistor $R_N$) located outside via feed lines, which lead into the base body 25. Moreover, the sensor head 23 is preferably rounded off for flow-related reasons.

In the case of the temperature probe 30 in FIG. 4, the sensor 20 is accommodated with the concentric radiation shield 32 in a through-hole in a base body 31. The radiation shield 32 is open at the top, but is closed at the bottom by a bottom, outlet openings 34, 35 being provided in said bottom for the emergence of the gases to be measured. The electrical connection of the heating elements 12, 13 or metal layers 21, 22 of the sensor 20 takes place at the upper end in turn via the sensor head 23 and connection lines 27 connected to the radiation shield 32. A connection part 33, which passes transversely through the annular channel and by means of which the feed lines to the heating elements 12, 13 are passed from the base body 31 to the sensor 20, is arranged at the lower end.

In summary, the following can be said in relation to the apparatus: The sensor 20 is part of a removable temperature probe 24 or 30. The sensor 20 is a cylindrical part, which is coated with two thin platinum layers 21, 22, which are connected to one another at one end via a sensor head 23 made from Cu. The platinum layers are arranged on a nonconductive cylindrical sensor body 19, which is made from a ceramic, for example. The sensor 20 rests concentrically in a radiation shield 26, 32 in order to prevent any influence of the thermal radiation from the walls of the gas turbine, to avoid the influence of the angle of flow on the measurement and to protect the sensor against particles and dirt. The radiation shield 26, 32 has a plurality of openings in its casing in order to improve convection and thus to increase the measurement accuracy. The sensor is part of an (electronic) circuit arrangement, which is designed such that the accuracy and time response can be optimized independently of one another. A particularly important property of the circuit arrangement and the closed-loop control circuit contained therein is the fact that the transmission function, i.e. the ratio between the output signal and the variables to be measured, is linear and independent of the flow speed of the gas. This means that only one calibration point or recalibration point is necessary. Other decisive advantages are the high degree of accuracy compared to thermocouples, the rapid signal response (time constants of 0.3 s can be achieved), and simpler installation compared to previously known measuring probes.

What is claimed is:

1. An apparatus for a rapid measurement of temperatures in a hot gas flow of a gas turbine, the apparatus comprising:
    an electrically insulating sensor body;
    a first two-dimensional electrically conductive heating element maintained at a first temperature;
    a second two-dimensional electrically conductive heating element maintained at a second temperature, the first temperature and the second temperature being different; and
    a resistor connected in series to the second heating element, wherein the first heating element and the second heating element are attached to a surface of the sensor body, wherein the first heating element is connected in parallel with the resistor and the second heating element; and
    an electrically conductive sensor head disposed at an end of the sensor body, the sensor head providing an electrically conductive connection between the two heating elements.

2. The apparatus as recited in claim 1, wherein the sensor body is cylindrical and extends along an axis, and wherein the two heating elements are disposed on opposite sides of the surface of the cylindrical sensor body relative to the axis.

3. The apparatus as recited in claim 2, wherein each of the two heating elements has a form of an elongate, thin layer extending in an axial direction.

4. The apparatus as recited in claim 3, wherein each layer is made of a metal.

5. The apparatus as recited in claim 4, wherein the metal is Pt.

6. The apparatus as recited in claim 2, further comprising a radiation shield surrounding the sensor concentrically at a distance from the sensor body so as to form an annular channel between the sensor body and the radiation shield, the hot gas flow passing through the annular channel past the heating elements.

7. The apparatus as recited in claim 6, wherein the annular channel is closed at a first end, is open at a second end, and includes outlet openings at the first end, and wherein the hot gas flow enters the annular channel through the second end, and leaves the annular channel through the outlet openings.

8. The apparatus as recited in claim 1, wherein the sensor head is made of Cu.

9. The apparatus as recited in claim 1, wherein the sensor body is made of a ceramic.

10. The apparatus as recited in claim 1, further comprising a radiation shield surrounding the sensor concentrically at a distance from the sensor body so as to form an annular channel between the sensor body and the radiation shield, the hot gas flow passing through the annular channel past the heating elements, wherein the radiation shield is electrically conductive and is electrically conductively connected to the sensor head so as to ground the sensor head.

11. The apparatus as recited in claim 1, wherein each of the heating elements are conductively connected to one another directly at a first end and via a first resistor at a second end, and wherein a circuit including the heating elements and the first resistor forms a first branch of a measurement bridge.

12. The apparatus as recited in claim 11, wherein the measurement bridge is part of a circuit arrangement configured to keep a resistance in the first branch constant.

13. The apparatus as recited in claim 12, wherein the circuit arrangement includes a closed-loop control circuit configured to adjust a current in a first bridge diagonal of the measurement bridge such that a voltage difference in a second bridge diagonal of the measurement bridge is zero.

14. An apparatus for a rapid measurement of temperatures in a hot gas flow of a gas turbine, the apparatus comprising:
    an electrically insulating sensor body;
    a first two-dimensional electrically conductive heating element;
    a second two-dimensional electrically conductive heating element; and
    a radiation shield surrounding the sensor body concentrically at a distance from the sensor body so as to form an annular channel between the sensor body and the radiation shield.

15. The apparatus as recited in claim 14, wherein the sensor body is cylindrical and extends along an axis, and wherein the two heating elements are disposed on opposite sides of the surface of the cylindrical sensor body relative to the axis.

16. The apparatus as recited in claim 15, wherein each of the two heating elements has a form of an elongate, thin layer extending in an axial direction.

17. The apparatus as recited in claim 15, wherein each of the heating elements includes an end at which the heating elements are electrically conductively connected to each other.

18. The apparatus as recited in claim 17, wherein the sensor body includes a first end and an electrically conductive sensor head disposed at the first end, and wherein the heating elements are electrically conductively connected to each other via the sensor head.

19. The apparatus as recited in claim 14, wherein the sensor head is made of Cu.

20. The apparatus as recited in claim 14, wherein the sensor body is made of a ceramic.

* * * * *